March 11, 1969  O. FREUDENSCHUSZ  3,432,229
PROJECTOR FOR SUBSTANDARD FORMAT FILM
Filed Aug. 12, 1966
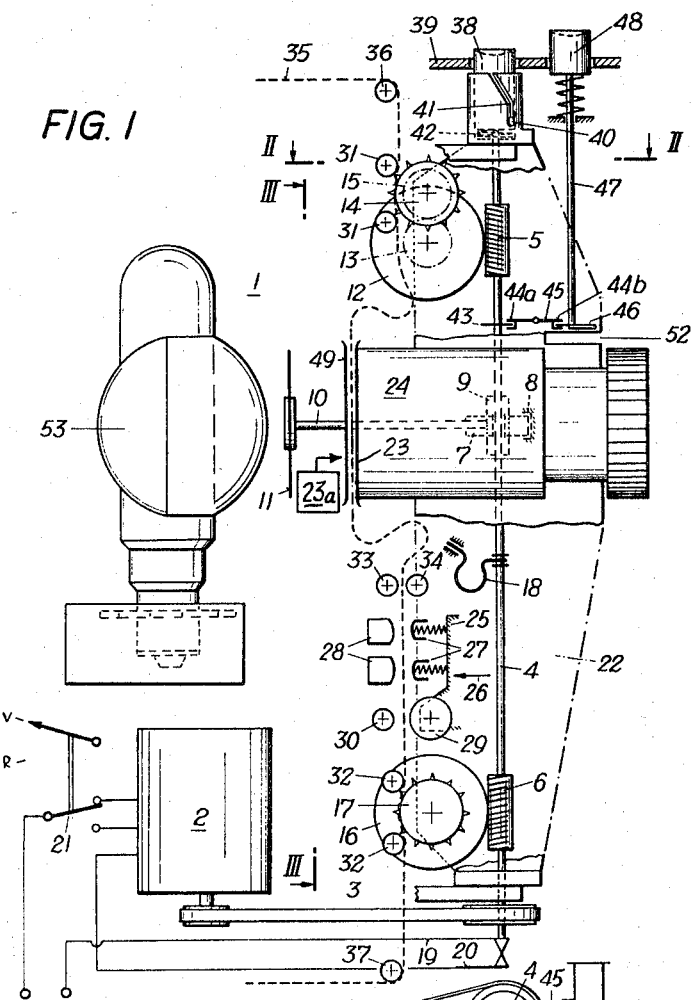
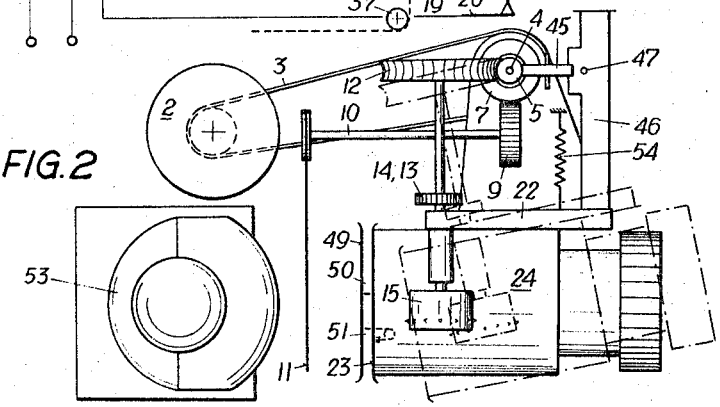
INVENTOR
OTTO FREUDENSCHUSZ FIG. 3
FIG. 4
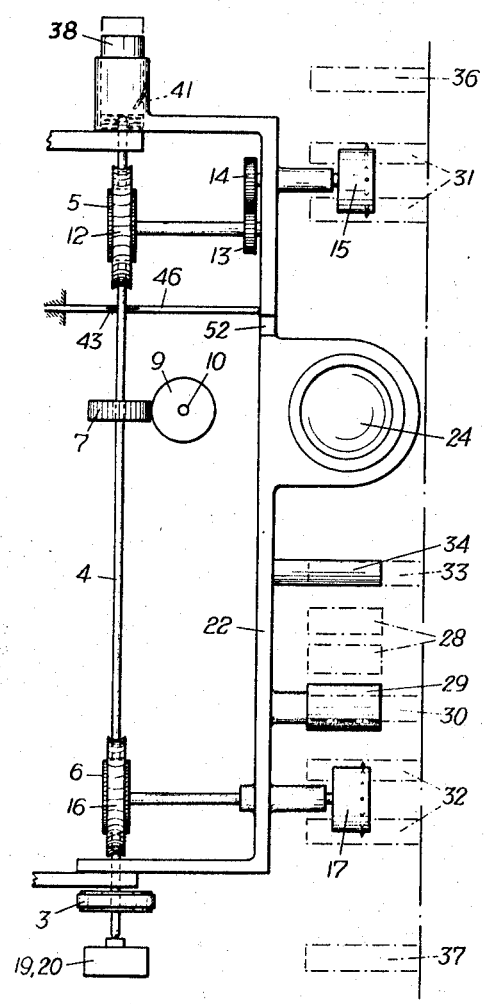
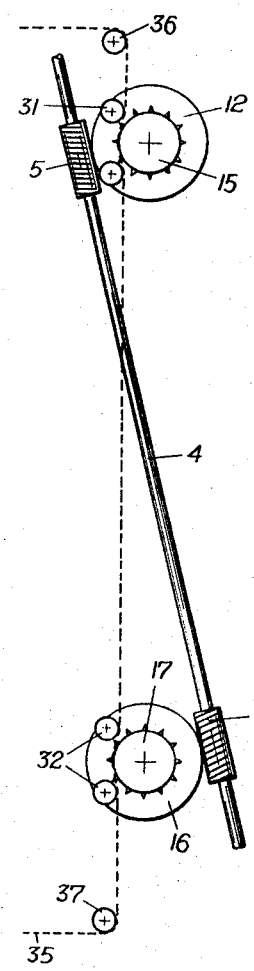

United States Patent Office 3,432,229
Patented Mar. 11, 1969

3,432,229
PROJECTOR FOR SUBSTANDARD FORMAT FILM
Otto Freudenschusz, Vienna, Austria, assignor to Karl Vockenhuber and Raimund Hauser, Vienna, Austria
Filed Aug. 12, 1966, Ser. No. 572,137
Claims priority, application Austria, Aug. 16, 1965,
A 7,535/65
U.S. Cl. 352—176            10 Claims
Int. Cl. G03b 1/04

ABSTRACT OF THE DISCLOSURE

A motion picture apparatus has a feed sprocket and a takeup sprocket connected by a drive shaft having a worm gear on each end for driving one of the sprockets. One worm gear has a lefthand thread and the other worm gear has a righthand thread. The drive shaft may be shifted axially such that the worm gears will rotate the feed sprocket and the takeup sprocket slightly in opposite directions to form film loops on opposite sides of the film gate and intermittent drive mechanism. The sprockets and a portion of the film gate are mounted on a carrier plate which may be pivoted about the drive shaft in order to open the gate.

---

The present invention relates to equipment for substandard format film, in general, and especially to a projector for substandard format film, provided with a feed sprocket and a take-up sprocket, which are driven by two worm gears arranged on a common shaft, and with a film channel, which is situated between the sprockets, in which the film is transported intermittently, in particular. In order to compensate the steady and the intermittent movements of the film, it is necessary to form film loops between the sprockets and the film channel.

It is one object of the present invention to provide a motion picture apparatus wherein the worm shaft is axially shiftable, whereby one of the two worms is righthanded and the other one is left-handed and the gearings which lie between the worm shaft and the film parts, driven by the sprockets, show transmission ratios of the same size and the same design.

It is another object of the present invention to provide a motion picture apparatus comprising means for shifting the shaft in an operative position, whereby the two sprockets transport the film in the direction of the film channel to form loops. Equipment for substandard format film are already known, in which the loops are formed automatically. Guides were proposed therefor, which are pivoted into the track of the film to form the loops and which in normal operation are removed from the film. According to another suggestion, the formation of film loops results from a relative rotation of the two sprockets. All of these devices however are rather complicated and especially the last-mentioned construction requires a rather high expenditure in the construction of gearings. These disadvantages are avoided by the present invention in an astonishingly simple way. The present invention provides a structure by which the formation of the loops results automatically, without essential additional expenditure.

It is yet another object of the present invention to provide a motion picture apparatus wherein the shaft props in its operative position against a switch arranged in the motor circuit, the shaft being shiftable from its operative position by the axial push of the worm gears; when in forward run the feed sprocket, and in reverse run, the takeup sprocket, are retarded and thus the switch is released, and consequently the latter changes over, or switches off, the motor in its sense of rotation.

With the above and other objects in view, which will become apparent in the following detailed description, thet present invention will be clearly understood in connection with the accompanying drawings in which:

FIGURE 1 is a schematic view of a projector for substandard format film, whereby the housing has been removed for clarity of presentation;

FIG. 2 is a section along the lines II—II of FIG. 1;

FIG. 3 is a section along the lines III—III of FIG. 1; and

FIG. 4 is a detail of another embodiment of the projector.

Referring now to the drawings a projector for substandard format film 1, comprises a driving motor 2 which is coupled to a vertically proceeding shaft 4 by means of a belt drive 3. The shaft 4 bears two worms 5 and 6 and a helical gear 7. The shaft 4 is shiftable in the axial direction and is coupled rotatably with the helical gear 7 by means of a catch, which is not illustrated separately. The helical gear 7, however, is secured against axial shifting by a bearing 8, which is schematically indicated. The helical gear 7 mates with a helical gear 9, the shaft 10 of which stands normally relative to shaft 4 and drives a shutter vane 11. The worm 5 is left-handed and mates with a worm gear 12, which drives a feed sprocket 15 over a pair of gear wheels 13 and 14. On the other hand the worm 6 is right-handed and is operatively connected with the takeup sprocket 17 over a worm gear 16. The shaft 4 is biased by an omega-formed spring 18 in its operative position as illustrated in FIG. 1, as well as in its rest position. In the operative position the shaft 4 rests on a contact spring 19, which lies opposite to a stationary contact 20. The switch formed by these two contacts 19 and 20 is situated in the motor circuit, which further contains a selector switch 21 for the direction of rotation. The two sprockets 15 and 17 are supported together with the worm gears and the gears 13 and 14 by a plate 22, which is pivotally mounted about the shaft 4. On the plate 22 are arranged a film guide 23 and a lens carrier 24. An intermittent film driving means 23a, i.e. a film gripper, intermittently drives the film within the film guide 23. A carrier 25 is slidably based in the direction of the arrow 26 on a plate 22, carrying the pressure plate 27 for stationary sound heads 28 and a pressing roller 29 for a capstan 30. Stationary guiding rollers 31, are disposed opposite to the sprocket 15 and keep the film 35 in mesh with the same. Corresponding guiding rollers 32 are provided for the takeup sprocket 17. A stationary roller 33 is provided and a roller 34 is arranged on the plate. The guide rollers 36 and 37 may be arranged either stationarily on the projector or also on the film guide of a cartridge. The shaft 4 is operated by means of a key 38, which is guided free of torsion in the housing 39 of the projector 1. The key has a radially directed pin 40 which is guided in a curved slot 41 of the plate 22. The slot 41 is curved in its upper part according to a screwline and at its lower part is parallel to the shaft 4. In the position shown in FIG. 1, the key 38 is pressed against the action of a spring 42 and props against the upper end of the shaft 4. A disk 43 fastened on the shaft 4 is surrounded by a fork 44a of a two-armed lever 45, the other end of which bears a fork 44b, which embraces a sheet spring. A key 48 props against this sheet spring by means of a switching bar 47.

In operation, the device of the present invention operates as follows. The device starts from a rest position in which the shaft 4 takes its upper final position and the plate 22 together with the lens carrier, and the sprockets take the position as defined by the dashed lines in FIG. 2. In this position a straight piece of film is inserted in the projection part of the apparatus. By pressing the key 38, the pin 40 in the slot of the plate is shifted downwardly. Thus the plate 22 is moved in a clockwise direction (FIG. 2), whereby the film guide 23 presses the film 35 to the stationary pressure plate 49. By means of lateral pressure plates 50 and 51, of which the first one is stationary and the second one is arranged on the film guide 23, the film is guided laterally and adjusted opposite to the film gate (not illustrated). As soon as the plate 22 takes the position marked in FIG. 2 in full lines, the sheet spring 46 is released, which moves under spring reaction from its original position in the slot 52 of the plate 22 to the position shown in FIG. 1. The sheet spring 46 props its free end against the plate 22, protecting it against torsion. By further pressing of the key 38, the same hits the upper end of the shaft 4 and moves the shaft downwardly, surmounting the power of the snap spring 18, which after having surmounted the dead center, biases the shaft 4 in its final lower position (the operative position). By shifting the shaft 4, the worm gears 12 and 16 are hobbed at the corresponding worms 5 and 6 in the manner of a rack-and-pinion drive, whereby the worm gear 16 and therewith also the takeup sprocket 17 is displaced in a clockwise direction. The worm gear 12 equally follows a torsion in the clockwise direction. By the intermediate gearing 13 and 14, the rotation of the worm wheel is transmitted to the spocket 15, which is rotated in a counterclockwise direction. In this way the film is transported from the feed sprocket as well as from the takeup sprocket in a direction to the film channel and thus the formation of the loops is effected. The intermittent film driving means 23a drives the film intermittently within the film guide 23. By displacing the carrier 25, the film may be contacted with the sound heads 28 by the aid of the pressure plate 27. The shaft 4 in its final lower position (FIG. 1) touches the movable contact 19 and presses the same to the stationary contact 20, closing the motor circuit. The shaft 4 is driven over the belt drive 3, whereby the two sprockets are set in rotation over the worm gearings, whereas the shutter vane 11 and the claw device are driven over the helical gears 7 and 9. Simultaneously with the switching-on of the motor, the projection lamp 53 can be activated. By moving the carrier 25, the pressing roller 29 is also forced into engagement with the film and the capstan 30, which is coupled with a flywheel (not shown) effecting a steady run of the film in the region of the sound heads.

When the film end is fastened to the core of the supply reel (not illustrated), a load peak occurs at the feed sprocket 15 after the run-off of the film. As a result thereof, an upwardly directed axial push occurs at the worm 5 and consequently at the shaft 4, which surmounts the power of the spring 18 and shifts the shaft 4 in its rest position, whereby the switch 19 and 20 is opened and the motor 2 is stopped. Simultaneously with the shifting of the shaft 4 the two-armed lever 45 is moved in a clockwise sense until the sheet spring comes to lie opposite to the slot 52 of the plate 22. The plate 22 is thereby unlocked and is turned in a clockwise sense by the spring 54. The film 35 then lies free in the projector and can be easily removed. According to another version of the present invention it is possible to control a selector switch for the rotating direction for the motor 2 by the shaft 4, instead of the switch 19 and 20. As a result thereof, the apparatus is automatically set on a reverse run after projection of the entire film. The two sprockets are thereby lifted and the film is spaced from the claw provided in the zone of the pressure plate 49, which, however, is not illustrated. The film is therefore only driven by the pin (not illustrated) of the supply reel and is correspondingly rewound with relatively high speed on the supply reel.

When the projector operates on reverse action and the beginning of the film is firmly connected with the core of the takeup reel, a corresponding retardation on the takeup sprocket 17 occurs after the rewind of the entire length of the film. Analogous to this procedure, the retardation causes an upwardly directed axial push, thus likewise effecting a switching off of the projector and a turning of the plate 22. Also during the performance, the projector may be stopped. Therefore the key 48 is pressed down, which moves the sheet spring 46 over the switching bar 47, until it lies opposite to the slot 52 of the plate 22 and unlocks the latter. Simultaneously the shaft 4 is moved upwardly over the two-armed lever 45 and consequently the motor circuit is interrupted.

Referring now again to the drawings, and more particularly to FIG. 4, another embodiment of the invention is illustrated, where for equal parts the same reference symbols have been used. To the opposite of the embodiment shown in FIGS. 1 to 3, the two worm gears 12 and 16 are directly coupled with the sprockets 15 and 17. In order to obtain the same direction of rotation of the two sprockets, the shaft 4 is inclined relative to the vertical, whereby the worm 5 is arranged to the left of the worm gear 12, and the worm 6 to the right of the worm gear 16. The other parts correspond with those shown in the preceding figures and are therefore not again illustrated. In an analogous way it is also possible to arrange the worms 5 and 6 on the same side of the worm gears and to guide the film on the right side of one sprocket and on the left side of the other sprocket. In this case it may be advisable to fix one of the sprockets and to provide the corresponding pressing rollers on the plate 22 and to base the other sprocket on the plate 22 and to fix the pressing rollers.

The invention is especially suitable for the use in projectors, which are loaded with cartridges as described in the copending application Ser. No. 569,629. The invention is not limited to projectors for substandard format films, but may be equally applied to cameras, viewers, editors and so on.

I claim:

1. A motion picture apparatus, comprising
   a housing,
   a feed sprocket and a takeup sprocket,
   said sprockets being adapted to continuously drive a film engaged by said sprockets about parts of their circumferences,
   guide means defining a film channel,
   intermittent film driving means adapted to intermittently drive the film within said film channel,
   a shaft rotatably and shiftably mounted in said housing,
   driving means adapted to rotatably drive said shaft,
   first gear means between said shaft and said feed sprocket including a first worm on said shaft,
   second gear means between said shaft and said takeup sprocket including a second worm on said shaft, one of the two worms being right-handed, the other one being left-handed,
   the transmission ratio between said shaft and the circumference part of the feed sprocket adapted to engage the film, and the transmission ratio between said shaft and the circumference part of the takeup sprocket adapted to engage the film, being of the same size, and
   carrier means pivotally mounted in said housing on said shaft and carrying at least said sprockets and a portion of said guide means.

2. A motion picture apparatus, as set forth in claim 1, further comprising
   shifting means for said shaft adapted to shift said shaft from a resting position into an operating position causing motion of the circumference part of the feed sprocket adapted to engage the film and the circumference part of said takeup sprocket adapted to engage the film in opposite directions, thereby forming film loops between the feed sprocket and the film channel and between the film channel and the takeup sprocket.

3. A motion picture apparatus comprising
   a housing, a feed sprocket and a takeup sprocket, said sprockets being adapted to continuously drive a film engaged by said sprockets about parts of their circumferences, guide means defining a film channel, intermittent film driving means adapted to intermittently drive the film within said film channel, a shaft rotatably and shiftably mounted in said housing, driving means adapted to rotatably drive said shaft, first gear means between said shaft and said feed sprocket including a first worm on said shaft, second gear means between said shaft and said takeup sprocket including a second worm on said shaft, one of the two worms being right-handed, the other one being left-handed, the transmission ratio between said shaft and the circumference part of the feed sprocket adapted to engage the film, and the transmission ratio between said shaft and the circumference part of the takeup sprocket adapted to engage the film, being of the same size, shifting means for said shaft adapted to shift the shaft from a resting position into an operating position causing motion of the circumference part of the feed sprocket adapted to engage the film and the circumference part of said takeup sprocket adapted to engage the film in opposite directions, thereby forming film loops between the feed sprocket and the film channel and between the film channel and the takeup sprocket, and locking means and releasing means for the latter, said locking means for locking said shaft in its operating position.

4. A motion picture apparatus, as set forth in claim 1, further comprising a spring means of the snap type axially acting on said shaft and biasing the latter in an operating and in a resting position.

5. A motion picture apparatus, comprising a housing, a feed sprocket and a takeup sprocket, said sprockets being adapted to continuously drive a film engaged by said sprockets about parts of their circumferences, guide means defining a film channel, intermittent film driving means adapted to intermittently drive the film within said film channel, a shaft rotatably and shiftably mounted in said housing, driving means adapted to rotatably drive said shaft, spring means of the snap type axially acting on said shaft and biasing the latter in an operating and in a resting position, control means for said driving means being interlocked with said shaft and actuated by shifting of the latter, first gear means between said shaft and said feed sprocket including a first worm on said shaft, second gear means between said shaft and said takeup sprocket including a second worm on said shaft, one of the two worms being right-handed, the other one being left-handed, the transmission ratio between said shaft and the circumference part of the feed sprocket adapted to engage the film and the transmission ratio between said shaft and the circumference part of the takeup sprocket adapted to engage the film being of the same size, and the axial push of the worms exceeding the force of said spring means, when one of said sprockets is retarded with a force, exceeding the normal load whereby said shaft is shifted from an operating position to a resting position and the control means of said driving means are actuated.

6. A motion picture apparatus, as set forth in claim 5, wherein said control means comprises a stopping means for said driving means for stopping the latter when said shaft is shifted to a resting position.

7. A motion picture apparatus, comprising a housing, a feed sprocket and a takeup sprocket, said sprockets being adapted to continuously drive a film engaged by said sprockets within parts of their circumferences, a first film guiding bar fixed on said housing, a second film guiding bar movably mounted with respect to said first one, said film guiding bar, in an operating position, defining a film channel, intermittent film driving means adapted to intermittently drive the film within said film channel, a shaft rotatably and shiftably mounted in said housing, driving means adapted to rotatably drive said shaft, first gear means between said shaft and said feed sprockets including a first worm on said shaft, second gear means between said shaft and said takeup sprocket including a second worm on said shaft, one of the two worms being right-handed, the other one being left-handed, the transmission ratio between said shaft and the circumference part of the feed sprocket adapted to engage the film, and the transmission ratio between said shaft and the circumference part of the takeup sprocket adapted to engage the film being of the same size, a plate pivotally mounted in said housing around said shaft, said sprockets, said gear means excluding said two worms and said second film guiding bar being arranged on said plate, a locking means for said plate, for locking said plate in an operating position in which the second film guiding bar is in an operating position, and releasing means for said locking means.

8. A motion picture apparatus as set forth in claim 7, further comprising spring means adapted to turn said plate out of its operating position.

9. A motion picture apparatus, as set forth in claim 7, further comprising spring means adapted to turn said plate out of its operating position, and said releasing means being controlled by said shaft acuating said releasing means when said shaft is shifted out of an operating position.

10. A motion picture apparatus, set forth in claim 7, further comprising a key shiftably mounted in said housing, a helical cam and a cam follower, constituting cam elements, one of said cam elements being arranged on said plate, the other of said cam elements arranged on said key, control means between said key and said shaft controlling the axial displacement of said shaft, and said cam elements and said control means being alternatively actuated by said key turning, in a first stage of depression of said key by said cam elements, said plate in its operating position and shifting, in a second stage of depression, the shaft in its operating position.

References Cited

UNITED STATES PATENTS 1,920,967   8/1933   Carpenter.
1,979,800   11/1934  Howell.

NORTON ANSHER, *Primary Examiner.*

MONROE H. HAYES, *Assistant Examiner.*

U.S. Cl. XR

242—55.12